(12) United States Patent
Zheng et al.

(10) Patent No.: US 10,782,126 B2
(45) Date of Patent: Sep. 22, 2020

(54) THREE-DIMENSIONAL SCANNING METHOD CONTAINING MULTIPLE LASERS WITH DIFFERENT WAVELENGTHS AND SCANNER

(71) Applicant: HANGZHOU SCANTECH COMPANY LIMITED, Hangzhou (CN)

(72) Inventors: Jun Zheng, Hangzhou (CN); Shangjian Chen, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/388,147

(22) Filed: Apr. 18, 2019

(65) Prior Publication Data

US 2019/0242697 A1    Aug. 8, 2019

Related U.S. Application Data

(63) Continuation-in-part of application No. PCT/CN2017/083919, filed on May 11, 2017, and a
(Continued)

(30) Foreign Application Priority Data

Oct. 19, 2016   (CN) .......................... 2016 1 0908731
Oct. 19, 2016   (CN) .......................... 2016 1 0910273

(51) Int. Cl.
*G01B 11/25*   (2006.01)
*G06T 7/80*    (2017.01)
(Continued)

(52) U.S. Cl.
CPC ............ *G01B 11/254* (2013.01); *G06T 7/521* (2017.01); *G06T 7/593* (2017.01); *G06T 7/85* (2017.01);
(Continued)

(58) Field of Classification Search
CPC ......... G01B 11/254; G06T 7/521; G06T 7/85; G06T 7/593; G06T 2207/10012;
(Continued)

(56) References Cited

U.S. PATENT DOCUMENTS

2015/0138349 A1* 5/2015 Hebert .................. G01B 11/25
                                                  348/136
2020/0134857 A1* 4/2020 Khatoonabadi ...... H04N 17/002

* cited by examiner

*Primary Examiner* — Hee-Yong Kim
(74) *Attorney, Agent, or Firm* — Osha Liang LLP (57) ABSTRACT

A three-dimensional (3D) scanning method is disclosed, including: projecting, by at least two laser projectors in a 3D scanner, laser contour lines onto a surface of a scanned object; capturing, by a first camera in the 3D scanner, a two-dimensional (2D) pattern of the laser contour lines projected onto the surface of the scanned object; identifying, by a processor in the 3D scanner, a 2D line set at a highlight center from the 2D pattern of the laser contour lines; generating, by the processor based on the 2D line set, 3D contour point cloud data of the surface of the scanned object according to triangulation, wherein a position of the first camera is fixed, the at least two laser projectors correspond to at least two different wavelengths, and a spatial position relationship between light planes projected by the at least two laser projectors and the first camera is predetermined.

17 Claims, 4 Drawing Sheets

Related U.S. Application Data continuation-in-part of application No. PCT/CN2017/083918, filed on May 11, 2017.

(51) Int. Cl.
| | |
|---|---|
| *G06T 7/521* | (2017.01) |
| *H04N 13/257* | (2018.01) |
| *H04N 9/64* | (2006.01) |
| *H04N 9/455* | (2006.01) |
| *G06T 7/593* | (2017.01) |

(52) U.S. Cl.
CPC .............. *H04N 9/455* (2013.01); *H04N 9/646* (2013.01); *H04N 13/257* (2018.05); *G06T 2207/10012* (2013.01); *G06T 2207/10028* (2013.01)

(58) Field of Classification Search
CPC ........ G06T 2207/10028; H04N 13/257; H04N 9/455; H04N 9/646
USPC .......................................................... 348/47
See application file for complete search history.

THREE-DIMENSIONAL SCANNING METHOD CONTAINING MULTIPLE LASERS WITH DIFFERENT WAVELENGTHS AND SCANNER

This application is a continuation-in-part of Application No. PCT/CN2017/083919, titled "THREE-DIMENSIONAL SCANNING METHOD CONTAINING MULTIPLE LASERS WITH DIFFERENT WAVELENGTHS AND SCANNER," filed on May 11, 2017, and Application No. PCT/CN2017/083918, titled "THREE-DIMENSIONAL SCANNING METHOD INCLUDING A PLURALITY OF LASERS WITH DIFFERENT WAVELENGTHS, AND SCANNER," filed on May 11, 2017, both of which are incorporated herein by reference.

BACKGROUND

In recent years, a majority of three-dimensional (3D) measuring instruments such as handheld 3D laser scanners and 3D laser contour sensors use a combination of a laser and a camera to obtain surface 3D data of an object based on triangulation. Such a measuring scheme is being increasingly widely used and has become one of the main measuring schemes in the field of high-precision 3D measurement. It is widely used in machinery, automotive, aviation, sculpture, medical and other industries.

In various 3D measuring methods based on a laser and a camera, the commonly used laser wavelengths include purple laser light of 405 nm, blue laser light of 450 nm, green laser light of 532 nm, red laser light of 650 nm, etc., and the influences of lasers with different wavelengths on the 3D scanning effect are also different. For example, the speckle phenomenon of red laser light is relatively obvious, which affects the accuracy of scanning, but red laser light is relatively stable and relatively safe to the human eye. In contrast, the speckle phenomenon of blue laser light is not obvious, so that cameras have a relatively high recognition accuracy for blue laser light, and a better scanning result can be obtained. However, blue laser light is harmful to the human eyes, and an operator needs to wear a goggle, which limits the application of 3D scanning. Therefore, it is difficult to choose a suitable laser wavelength that meets the needs of different 3D scanning scenarios.

SUMMARY

In view of the shortcomings of the existing handheld 3D laser scanner with only a single wavelength laser, poor applicability, and high cost, one or more embodiments of the present invention provide a 3D scanner and a scanning system that include a plurality of laser projectors with different wavelengths and a corresponding scanning method. The 3D scanner, scanning system, and scanning method disclosed have the advantages of having multiple laser lights of different wavelengths, good applicability, and increased reusability of a single 3D scanner rendering cost effectiveness.

In general, in one aspect, the disclosed technology is directed toward a 3D scanning method that includes: projecting, by at least two laser projectors in a 3D scanner, laser contour lines onto a surface of a scanned object; capturing, by a first camera in the 3D scanner, a two-dimensional (2D) pattern of the laser contour lines projected onto the surface of the scanned object; identifying, by a processor in the 3D scanner, a 2D line set at a highlight center from the 2D pattern of the laser contour lines; and generating, by the processor based on the 2D line set, 3D contour point cloud data of the surface of the scanned object according to triangulation, wherein a position of the first camera is fixed, wherein the at least two laser projectors correspond to at least two different wavelengths, and wherein a spatial position relationship between light planes projected by the at least two laser projectors and the first camera is predetermined.

In general, in another aspect, the disclosed technology is directed toward a 3D scanner that includes: at least two laser projectors, the at least two laser projectors corresponding to at least two different wavelengths; at least one camera for capturing a laser pattern projected by the at least two laser projectors onto a surface of a scanned object; and a processor capable of image recognition and 3D reconstruction, wherein a spatial position relationship between light planes projected by the at least two laser projectors and the at least one camera is predetermined, an output end of the at least one camera is connected to the processor, the processor includes a 2D image laser contour line extractor, a 3D constructor, and a wavelength switching determiner that selects internal parameters and distortion coefficients of the at least one camera at a selected wavelength, the output end of the at least one camera is connected to the 2D image laser contour line extractor, the 2D image laser contour line extractor is connected to the 3D constructor, and the wavelength switching determiner is connected to the 2D image laser contour line extractor and the 3D constructor.

In general, in another aspect, the disclosed technology is directed toward a 3D scanning system that includes: a 3D scanner and a scanned object. The 3D scanner includes: at least two laser projectors, the at least two laser projectors corresponding to at least two different wavelengths; at least one camera for capturing a laser pattern projected by the at least two laser projectors onto a surface of the scanned object; and a processor capable of image recognition and 3D reconstruction, wherein: a spatial position relationship between light planes projected by the at least two laser projectors and the at least one camera is predetermined, an output end of the at least one camera is connected to the processor, the processor includes a 2D image laser contour line extractor, a 3D constructor, and a wavelength switching determiner that selects internal parameters and distortion coefficients of the at least one camera at a selected wavelength, the output end of the at least one camera is connected to the 2D image laser contour line extractor, the 2D image laser contour line extractor is connected to the 3D constructor, and the wavelength switching determiner is connected to the 2D image laser contour line extractor and the 3D constructor.

Specifically, in one or more embodiments of the invention, a laser having a shorter wavelength and a laser having a longer wavelength are simultaneously mounted in a 3D scanner. Since light beams of different wavelengths differ in their refractive indices when passing through two media, a camera with a fixed focal length and aperture has different focal points for light beams of different wavelengths. The focal point in a situation where an object that reflects light of a shorter wavelength is captured is closer to the camera than that in a situation where an object that reflects light of a longer wavelength is captured. Taking red and blue bands for example, in order to obtain the correct focal points, a blue object should be closer to the camera than a red object. When the camera resolution is the same, capturing closer objects means that a smaller part is projected on the same area of the photosensitive component. In other words, the captured plane dimension of the blue object is smaller with a higher resolution, while the captured plane dimension of the red object is larger with a lower resolution. In addition, since laser light is monochromatic, interference occurs when it is reflected on the surface of the object, such that unevenly distributed granular spots (i.e., laser scattered spots) appear on the laser contour lines of the surface of the object captured by the camera. When using a laser with a shorter wavelength, the speckle phenomenon is weaker than when using a laser with a longer wavelength, and the laser contour lines of the surface of the object captured by the camera is sharper, which is more favorable for obtaining the details of the surface of the object.

Compared with a conventional 3D scanner having a laser with only a single wavelength, the 3D scanner according to one or more embodiments of the present invention may advantageously be applied to both high-precision and normal 3D scanning scenarios with high efficiency and safety, which may greatly increase the reusability of a single 3D scanner rendering cost effectiveness.

Other aspects of the disclosure will be apparent from the following description and the appended claims.

BRIEF DESCRIPTION OF DRAWINGS

The dashed boxes in FIGS. 1 and 2 represent that components within the boxes may or may not be present.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, in one aspect, the disclosed technology relates to three-dimensional (3D) scanning technology, in particular to a 3D scanning method, a 3D scanner, and a 3D scanning system.

In one or more embodiments, the 3D scanning method further includes: changing a relative position between the 3D scanner and the scanned object so that the first camera captures the 2D pattern of the laser contour lines in a series of consecutive frames including at least a first frame and a second frame; directly obtaining the change of the relative position between the first frame and the second frame captured by the first camera, wherein the scanned object is disposed on a pipeline with a position signal, a linear ramp with a position signal, or a rotating platform with an angle signal; and splicing, using the change of the relative position, 3D contour line point cloud data obtained from the series of consecutive scanned frames in a coordinate system to generate complete 3D contour point cloud data of the surface of the scanned object.

In one or more embodiments, generating 3D contour point cloud data further includes: calibrating in advance internal parameters and distortion coefficients of the first camera at different wavelengths; respectively calibrating in advance the spatial position relationships between the light planes projected by the at least two laser projectors and the first camera.

Before Scanning:

In one or more embodiments, selecting, from the at least two laser projectors, a laser projector with a corresponding wavelength according to requirements of field accuracy and scanning plane dimensions; selecting, according to configurations and the selected wavelength, the internal parameters and distortion coefficients of the first camera; selecting, according to the configurations, position parameters of the selected laser projector and the first camera; and outputting, to the processor, the selected internal parameters and distortion coefficients of the first camera and the selected position parameters of the selected laser projector and the first camera.

When Scanning:

In one or more embodiments, inputting, to the processor, the 2D pattern of the laser contour lines captured by the first camera; correcting, by the processor, according to the selected internal parameters and distortion coefficients of the first camera at the selected wavelength, distortion of the captured 2D pattern of the laser contour lines; extracting a connected region of a line contour from the corrected 2D pattern of the laser contour lines according to grayscale differences between pixels; calculating to obtain the 2D line set at the highlight center at sub-pixel level according to grayscale gravity center of the connected region; outputting the 2D line sets to the processor; generating, based on triangulation, the 3D contour point cloud data, according to the selected internal parameters and distortion coefficients of the first camera and the selected position parameters of the selected laser projector and the first camera; and outputting the 3D contour point cloud data.

In one or more embodiments, a 3D scanning method according to one or more embodiments of the invention further including: capturing, by at least a second camera, the 2D pattern of the laser contour lines; changing a relative position between the 3D scanner and the scanned object so that the first camera and the second camera each capture the 2D pattern of the laser contour lines in a series of consecutive frames including at least a first frame and a second frame; identifying, by the processor, intrinsic feature points that are on the surface of the scanned object and visible to the first and second cameras, so as to obtain the change of relative position between the first frame and the second frame; splicing, by the processor using the change of relative position, 3D contour line point cloud data obtained from the series of consecutive frames in a coordinate system; and generating, by the processor, complete 3D contour point cloud data of the surface of the scanned object.

In one or more embodiments, generating 3D contour point cloud data further includes: calibrating in advance internal parameters and distortion coefficients of the first and second cameras at different wavelengths; respectively calibrating in advance a spatial position relationship between the first and second cameras.

Before Scanning:

In one or more embodiments, selecting, from the at least two laser projectors, a laser projector with a corresponding wavelength according to requirements of field accuracy and scanning plane dimensions; selecting, according to configurations and the selected wavelength, internal parameters and distortion coefficients of the first and second cameras; and outputting, to the processor, the selected internal parameters and distortion coefficients of the first and second cameras.

When Scanning:

In one or more embodiments, synchronously inputting, to the processor, the 2D patterns of the laser contour lines respectively captured by the first and second cameras; respectively correcting, according to the internal parameters and the distortion coefficients of the first and second cameras at the selected wavelength, distortion of the 2D patterns of the laser contour lines respectively captured by the first camera and the second camera; respectively extracting connected regions of line contours from the corrected 2D patterns of the laser contour lines according to grayscale differences between pixels; calculating to obtain the 2D line sets at the highlight centers at sub-pixel level according to grayscale gravity centers in the respective connected regions; outputting the 2D line sets to the processor; generating, by the processor, the 3D contour point cloud data based on principles of epipolar constraint according to the selected internal parameters, distortion coefficients and spatial position relationship of the first and second cameras.

Example 1

Figure 1:
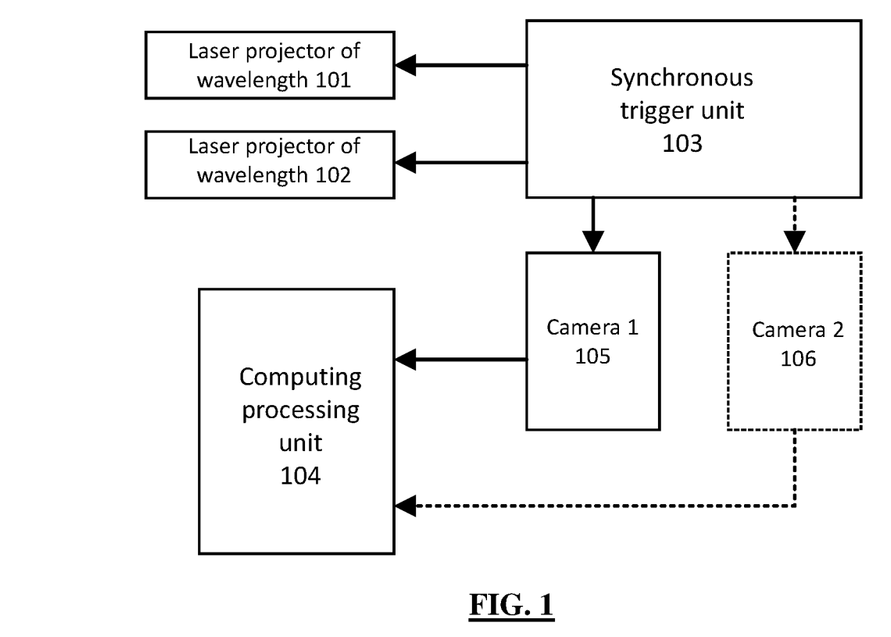
FIG. 1 is a schematic diagram of a 3D scanner having a plurality of laser projectors with different wavelengths in accordance with one or more embodiments of the invention.
Figure 4:
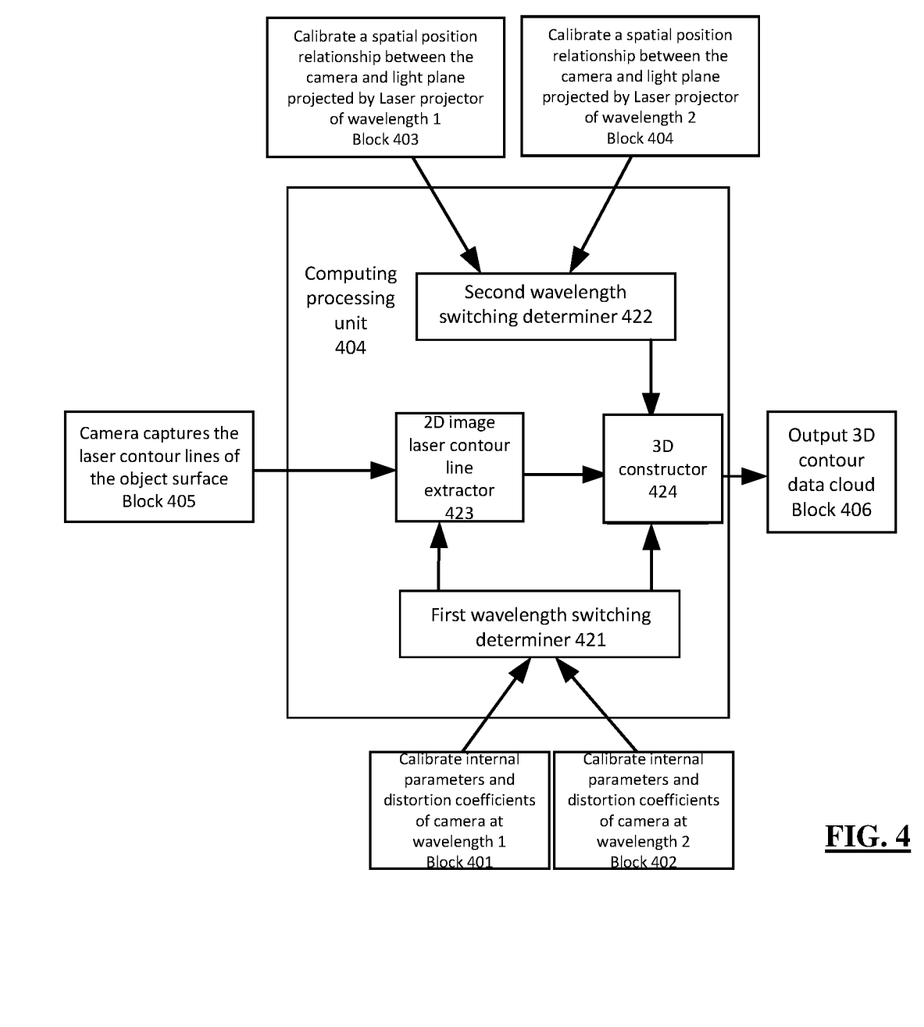
FIG. 4 is a schematic diagram of a computing processing unit in accordance with one or more embodiments of the invention.

Referring to FIGS. 1 and 4, a 3D scanning method according to one or more embodiments of the invention is described.

As shown in FIG. 1, when only one camera is used for capturing the object (that is, when camera 2 (106) in the dashed box is not present or does not work), the 3D scanner includes a fixed camera (e.g., camera 1 (105)), at least two laser projectors (e.g., laser projector of wavelength (101), laser projector of wavelength (102)), a processor (e.g., computing processing unit (104)) and a synchronous trigger unit (e.g., synchronous trigger unit (103)). The at least two laser projectors correspond to at least two different wavelengths. A spatial position relationship between light planes projected by the at least two laser projectors and the camera is predetermined. The synchronous trigger unit is connected to laser projector of wavelength 1, laser projector of wavelength 2, and camera 1, and synchronously triggers camera 1 and one laser projector, selected from the at least two laser projectors, that corresponds to a selected wavelength.

FIG. 4 is a schematic diagram of a computing processing unit in accordance with one or more embodiments of the invention. The computing processing unit (e.g., computing processing unit 404) is the processor or part of the processor of the invention. As shown, the computing processing unit includes a first wavelength switching determiner (e.g., first wavelength switching determiner (421)), a second wavelength switching determiner (e.g., second wavelength switching determiner (422)), a 2D image laser contour line extractor (e.g., 2D image laser contour line extractor (423)), and a 3D constructor (e.g., 3D constructor (424)).

The principle of obtaining 3D contour data of a surface of an object in one or more embodiments is specifically described by taking an example that uses one camera, a linear laser projector of a red band, and a linear laser projector of a blue band. Laser projector of wavelength 1 is a red linear laser projector, and laser projector of wavelength 2 is a blue linear laser projector. The synchronous trigger unit is connected to both an external trigger interface of camera 1 and drive control interfaces of the two laser projectors and synchronously triggers camera 1 and the laser projector of the selected wavelength. The image captured by camera 1 in real time is sent to the computing processing unit for 3D reconstruction of stereoscopic vision, and the final 3D contour point cloud data is generated and outputted. The implementation process is shown by the directions of the arrows in FIG. 4, and the specific steps are as follows:

In Step 1 (e.g., Block (401) and Block (402) in FIG. 4), internal parameters and distortion coefficients of camera 1 at wavelength 1 and wavelength 2 (wavelength 1 and wavelength 2 being the working wavelengths of the first laser projector and the second laser projector, respectively) are calibrated in advance and stored in the calculating processing unit of the system. The calibration method can be the widely used Zhengyou Zhang calibration method to obtain the focal length, center offset, and coefficients of radial distortion and tangential distortion of the camera.

In Step 2 (e.g., Block (403) and Block (404) in FIG. 4), a spatial position relationship between light planes projected by laser projector of wavelength 1 and camera 1 and a spatial position relationship between light planes projected by laser projector of wavelength 2 and camera 1 are respectively calibrated in advance, and the calibrated parameters are stored in the calculating processing unit of the system. In one or more embodiments, the method of respectively calibrating spatial position relationships between the light planes projected by the two laser projectors and the camera uses a flat plate having a predetermined feature on its surface as a calibration plate. Camera 1 captures a linear laser beam projected onto the calibration plate to obtain a 2D linear laser image. Then, by using principles of affine transformation, the calibration plate in the 2D linear laser image is "stretched" into an actual size in 3D coordinates, while obtaining a 3D laser contour line in a coordinate system of camera 1. By moving the 3D scanner by a plurality of distances relative to the calibration plate, a plurality of 3D laser contour lines in the coordinate system of camera 1 can be determined. A plane equation is fitted to a point cloud of the plurality of 3D laser contour lines in the coordinate system of camera 1, wherein the plane equation represents the calibrated parameters of the spatial position relationships between the light planes projected by the laser projectors and camera 1.

In Step 3, before scanning, a red band or blue band may be selected for scanning according to requirements of field accuracy and scanning plane dimensions, and the selection result is stored in a wavelength switching determiner. The wavelength switching determiner includes a first wavelength switching determiner and a second wavelength switching determiner. The first wavelength switching determiner selects internal parameters and distortion coefficients of camera 1 at a selected wavelength according to configurations and outputs the selected internal parameters and distortion coefficients of camera 1 to a 2D image laser contour line extractor and a 3D constructor. The second wavelength switching determiner selects position parameters of the selected laser projector and camera 1 according to configurations and outputs the position parameters to the 3D constructor.

In Step 4 (e.g., Block (405) and Block (406) in FIG. 4), when scanning, a 2D pattern of the laser contour lines captured by camera 1 is input to the 2D image laser contour line extractor. The 2D image laser contour line extractor corrects, according to the selected internal parameters and distortion coefficients of camera 1 at the selected wavelength, distortion of the captured 2D pattern of the laser contour lines, extracts a connected region of a line contour from the corrected 2D pattern of the laser contour lines according to grayscale differences between pixels, and calculates to obtain a 2D line set at a highlight center at sub-pixel level according to a grayscale gravity center of the connected region. The obtained 2D line set is sent to the 3D constructor. According to the selected internal parameters and distortion coefficients of camera 1 and the selected position parameters of the selected laser projector and camera 1, 3D contour point cloud data is generated based on triangulation and is outputted.

Example 2

Figure 3:
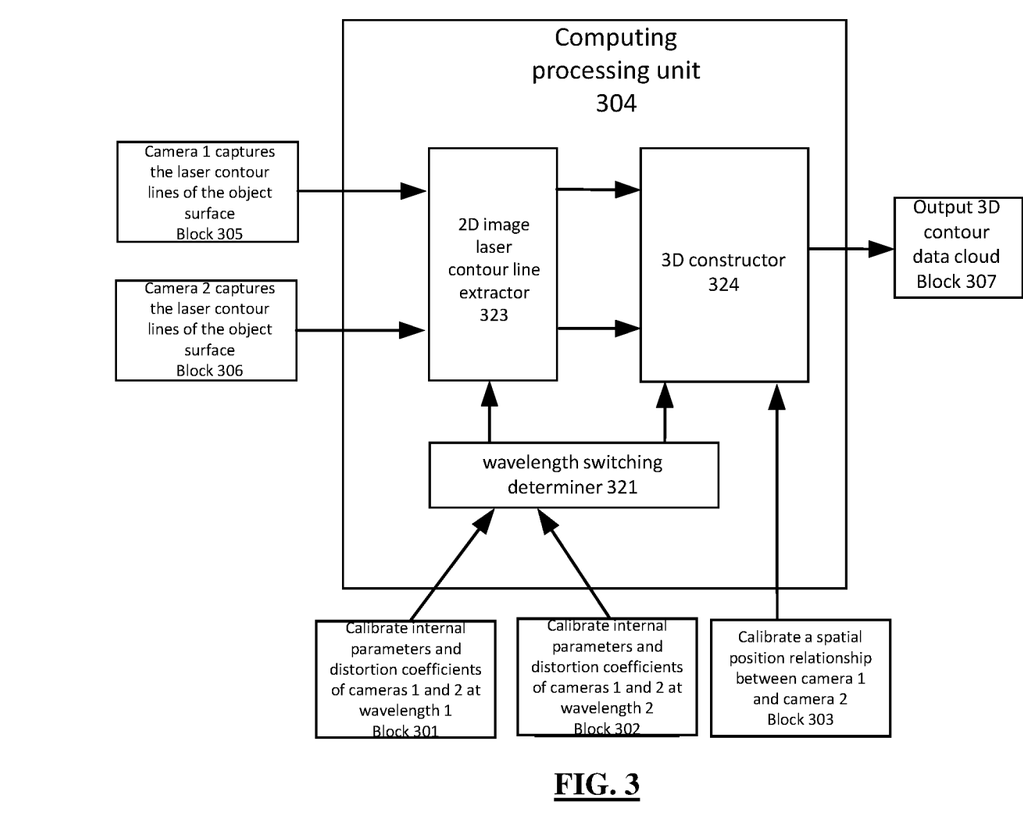
FIG. 3 is a schematic diagram of a computing processing unit in accordance with one or more embodiments of the invention.

Referring to FIGS. 1 and 3, a 3D scanning method according to one or more embodiments of the disclosed technology is described.

As shown in FIG. 1, when at least two cameras are used to capture images (i.e., when camera 2 in the dashed box is present and works), the 3D scanner includes at least two fixed cameras (camera 1 and camera 2), at least two laser projectors (laser projector of wavelength 1 and laser projector of wavelength 2), a processor (computing processing unit), and a synchronous trigger unit. The at least two laser projectors correspond to at least two different wavelengths, and spatial position relationships between light planes projected by the at least two laser projectors and the two cameras are calibrated and predetermined. The synchronous trigger unit is connected to laser projector of wavelength 1, laser projector of wavelength 2, camera 1, and camera 2.

FIG. 3 is a schematic diagram of a computing processing unit in accordance with one or more embodiments of the invention. The computing processing unit (e.g., computing processing unit (304)) is the processor or part of the processor in the invention. As shown, the computing processing unit includes a wavelength switching determiner (e.g., wavelength switching determiner (321)), a 2D image laser contour line extractor (2D image laser contour line extractor (323)), and a 3D constructor (e.g., 3D constructor (324)).

The principle of one or more embodiments is specifically illustrated by taking an example that uses two cameras, a linear laser projector of a red band, and a linear laser projector of a blue band. Laser projector of wavelength 1 is a red linear laser projector, and laser projector of wavelength 2 is a blue linear laser projector. The synchronous trigger unit is connected to both external trigger interfaces of the two cameras (camera 1, camera 2) and drive control interfaces of the two laser projectors and synchronously triggers the two cameras and the laser projector of the selected wavelength. Images captured by the two cameras in real time are sent to the computing processing unit for 3D reconstruction of stereoscopic vision, and the final 3D contour point cloud data is generated and outputted. The implementation process is shown by the directions of the arrows in FIG. 3, and the specific steps are as follows:

In Step 1 (e.g., Block (301) and Block (302)), internal parameters and distortion coefficients of camera 1 and camera 2 at wavelength 1 and wavelength 2 (wavelength 1 and wavelength 2 being the wavelengths of laser projector 1 and laser projector 2, respectively) are calibrated in advance and stored in the computing processing unit of the system. The calibration method can be the widely used Zhengyou Zhang calibration method to obtain the focal lengths, center offsets, and coefficients of radial distortion and tangential distortion of the cameras.

In Step 2 (e.g., Block (303)), a spatial position relationship between camera 1 and camera 2 is calibrated in advance. The calibration method can be the common stereo calibration method, and the calibration results are stored in the 3D constructor.

In Step 3, before scanning, the laser projector of the blue band or red band is selected according to requirements of field accuracy and scanning plane dimensions, and the selection result is stored in the wavelength switching determiner. The wavelength switching determiner selects internal parameters and distortion coefficients of the two cameras at a selected wavelength according to configurations and outputs the selected internal parameters and distortion coefficients of the two cameras to the 2D image laser contour line extractor and the 3D constructor.

In Step 4 (e.g., Block (305), Block (306), and/or Block (307)), when scanning, 2D patterns of the laser contour lines respectively captured by cameras 1 and 2 are synchronously inputted to the 2D image laser contour line extractor of the computing processing unit. According to the selected internal parameters and the distortion coefficients of cameras 1 and 2 at the selected wavelength, distortion of the 2D patterns of the laser contour lines are corrected. Connected regions of line contours from the corrected 2D patterns of the laser contour lines are respectively extracted according to grayscale differences between pixels. By calculation, 2D line sets at highlight centers at sub-pixel level are obtained according to grayscale gravity centers in the respective connected regions. The obtained 2D line sets are outputted to the 3D constructor, and the 3D constructor generates 3D contour point cloud data based on principles of epipolar constraint according to the selected internal parameters, distortion coefficients, and the spatial position relationship of cameras 1 and 2.

Example 3

Referring to FIGS. 1-4, a 3D scanner in accordance with one or more embodiments of the invention is described. As shown in FIG. 1, the three-dimensional (3D) scanner includes at least two laser projectors, at least one camera for capturing a laser pattern projected by the at least two laser projectors onto a surface of a scanned object, and a computing processing unit capable of image recognition and 3D reconstruction that is connected to the at least one camera. The at least two laser projectors correspond to at least two different wavelengths and are disposed at fixed positions. A spatial position relationship between light planes projected by the at least two laser projectors and the at least one camera is predetermined. An output end of the at least one camera is connected to the computing processing unit. As shown in FIGS. 3 and 4, the computing processing unit includes a two-dimensional (2D) image laser contour line extractor, a 3D constructor, and a wavelength switching determiner that selects internal parameters and distortion coefficients of the at least one camera at a selected wavelength. The output end of the at least one camera is connected to the 2D image laser contour line extractor, the 2D image laser contour line extractor is connected to the 3D constructor, and the wavelength switching determiner is connected to the 2D image laser contour line extractor and the 3D constructor.

Further, a synchronous trigger unit is connected to triggering ends of said laser projectors and said at least one camera, and selectively triggers one or more laser projectors of the same wavelength to operate synchronously with the at least one camera.

Further, a bandpass filter is mounted on the at least one camera, and a passing band of the bandpass filter corresponds to the at least two wavelengths of the at least two laser projectors.

Further, the at least two laser projectors include a laser projector of a blue band and a laser projector of a red band.

A 3D scanner according to one or more embodiments of the invention will be described by taking a 3D scanner equipped with a linear laser projector of a red band and a linear laser projector of a blue band for example. As shown in FIG. 1, laser projector of wavelength 1 is a red linear laser projector, and laser projector of wavelength 2 is a blue linear laser projector. In this embodiment, the at least one camera may be one or two cameras, and the synchronous trigger unit is simultaneously connected to an external trigger interface(s) of the one or two cameras and driving interfaces of the two laser projectors and synchronously triggers the one or two cameras and a laser projector of a selected wavelength. An image captured by the at least one camera in real time is sent to the computing processing unit for 3D reconstruction of stereoscopic vision, and final 3D contour point cloud data is generated and outputted.

Figure 2:
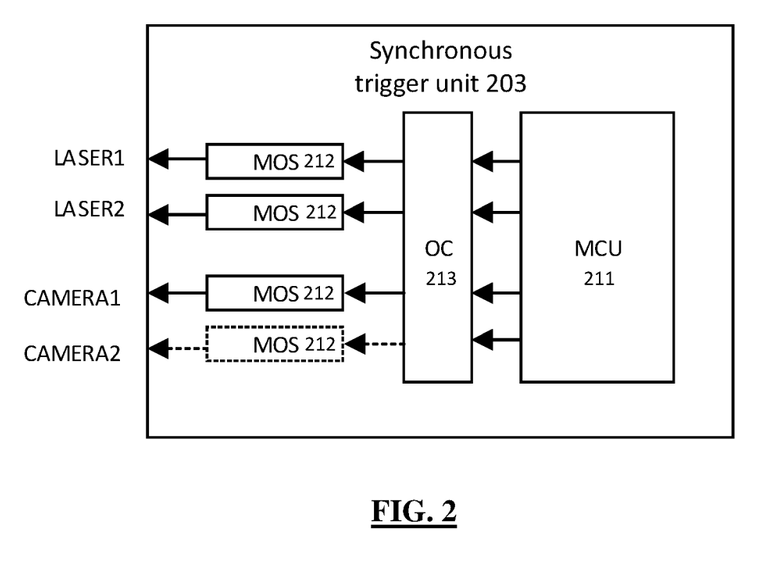
FIG. 2 is a schematic diagram of the working principle of a synchronous trigger unit in accordance with one or more embodiments of the invention.

As shown in FIG. 2, the synchronous trigger unit (e.g., synchronous trigger unit (203)) can be controlled by a micro control unit (MCU) (e.g., MCU (211)). The MCU outputs synchronous control signals to power devices MOSs (e.g., MOSs (212)) through an isolation device (OC) (e.g., OC (213)) to control the synchronous operation of the laser projectors LASER1/LASER2 and the cameras CAMERA1/CAMERA2. The MCU's firmware determines whether to trigger red light LASER 1 or blue light LASER 2 to work synchronously with CAMERA 1 and/or CAMERA 2 at a given time, depending on the user's selection.

Furthermore, if continuous scanning is performed, the MCU cyclically triggers the laser projectors and the camera(s) synchronously according to a set frame rate. The captured images are continuously inputted to the computing processing unit for 3D reconstruction of 3D stereoscopic vision, and 3D contour point cloud data is continuously outputted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A three-dimensional (3D) scanning method, comprising:
   projecting, by at least two laser projectors in a 3D scanner, laser contour lines onto a surface of a scanned object;
   capturing, by a first camera in the 3D scanner, a two-dimensional (2D) pattern of the laser contour lines projected onto the surface of the scanned object;
   identifying, by a processor in the 3D scanner, a 2D line set at a highlight center from the 2D pattern of the laser contour lines; and
   generating, by the processor based on the 2D line set, 3D contour point cloud data of the surface of the scanned object according to triangulation,
   wherein
      a position of the first camera is fixed,
      the at least two laser projectors correspond to at least two different wavelengths, and
      a spatial position relationship between light planes projected by the at least two laser projectors and the first camera is predetermined.

2. The 3D scanning method according to claim 1, further comprising:
   capturing, by at least a second camera, the 2D pattern of the laser contour lines;
   changing a relative position between the 3D scanner and the scanned object so that the first camera and the second camera each capture the 2D pattern of the laser contour lines in a series of consecutive frames comprising at least a first frame and a second frame;
   identifying, by the processor, intrinsic feature points that are on the surface of the scanned object and visible to the first and second cameras, so as to obtain the change of relative position between the first frame and the second frame;
   splicing, by the processor using the change of relative position, 3D contour line point cloud data obtained from the series of consecutive frames in a coordinate system; and
   generating, by the processor, complete 3D contour point cloud data of the surface of the scanned object.

3. The 3D scanning method according to claim 1, further comprising:
   changing a relative position between the 3D scanner and the scanned object so that the first camera captures the 2D pattern of the laser contour lines in a series of consecutive frames comprising at least a first frame and a second frame;
   directly obtaining the change of the relative position between the first frame and the second frame captured by the first camera,
      wherein the scanned object is disposed on a pipeline with a position signal, a linear ramp with a position signal, or a rotating platform with an angle signal; and
   splicing, using the change of the relative position, 3D contour line point cloud data obtained from the series of consecutive frames in a coordinate system to generate complete 3D contour point cloud data of the surface of the scanned object.

4. The 3D scanning method according to claim 1, wherein generating 3D contour point cloud data further comprises:
   calibrating in advance internal parameters and distortion coefficients of the first camera at different wavelengths;
   respectively calibrating in advance spatial position relationships between light planes projected by the at least two laser projectors and the first camera;
   before scanning,
      selecting, from the at least two laser projectors, a laser projector with a corresponding wavelength according to requirements of field accuracy and scanning plane dimensions;

selecting, according to configurations and the selected wavelength, the internal parameters and distortion coefficients of the first camera;

selecting, according to the configurations, position parameters of the selected laser projector and the first camera; and outputting, to the processor, the selected internal parameters and distortion coefficients of the first camera and the selected position parameters of the selected laser projector and the first camera; and when scanning, inputting, to the processor, the 2D pattern of the laser contour lines captured by the first camera;

correcting, by the processor according to the selected internal parameters and distortion coefficients of the first camera at the selected wavelength, distortion of the captured 2D pattern of the laser contour lines;

extracting a connected region of a line contour from the corrected 2D pattern of the laser contour lines according to grayscale differences between pixels;

calculating to obtain the 2D line set at the highlight center at sub-pixel level according to grayscale gravity center of the connected region;

outputting the 2D line set to the processor;

generating, based on triangulation, the 3D contour point cloud data according to the selected internal parameters and distortion coefficients of the first camera and the selected position parameters of the selected laser projector and the first camera; and outputting the 3D contour point cloud data.

5. The 3D scanning method according to claim 2, wherein generating 3D contour point cloud data further comprises:

calibrating in advance internal parameters and distortion coefficients of the first and second cameras at different wavelengths;

calibrating in advance spatial position relationships between the first and second cameras;

before scanning, selecting, from the at least two laser projectors, a laser projector with a corresponding wavelength according to requirements of field accuracy and scanning plane dimensions;

selecting, according to configurations and the selected wavelength, internal parameters and distortion coefficients of the first and second cameras; and outputting, to the processor, the selected internal parameters and distortion coefficients of the first and second cameras; and when scanning, synchronously inputting, to the processor, the 2D patterns of the laser contour lines respectively captured by the first and second cameras;

respectively correcting, according to the internal parameters and the distortion coefficients of the first and second cameras at the selected wavelength, distortion of the 2D patterns of the laser contour lines respectively captured by the first camera and second camera;

respectively extracting connected regions of line contours from the corrected 2D patterns of the laser contour lines according to grayscale differences between pixels;

calculating to obtain 2D line sets at highlight centers at sub-pixel level according to grayscale gravity centers in the respective connected regions;

outputting the 2D line sets to the processor; and generating, by the processor, the 3D contour point cloud data based on principles of epipolar constraint according to the selected internal parameters, distortion coefficients, and spatial position relationships of the first and second cameras.

6. The 3D scanning method according to claim 4, wherein the calibration of the internal parameters and the distortion coefficients is based on Zhengyou Zhang calibration method.

7. The 3D scanning method according to claim 4, wherein respectively calibrating spatial position relationships comprises:

using a flat plate having a predetermined feature on a surface as a calibration plate;

capturing, by the first camera, a linear laser beam projected onto the calibration plate to obtain a 2D linear laser image;

stretching, using principles of affine transformation, the calibration plate in the 2D linear laser image into an actual size in 3D coordinates, while obtaining a 3D laser contour line in a coordinate system of the first camera;

determining a plurality of 3D laser contour lines in the coordinate system of the first camera by moving the 3D scanner by a plurality of distances relative to the calibration plate; and fitting a plane equation to a point cloud of the plurality of 3D laser contour lines in the coordinate system of the first camera, wherein the plane equation represents calibrated parameters of the spatial position relationships between the light planes projected by the at least two laser projectors and the first camera.

8. The 3D scanning method according to claim 5, wherein the calibration of the internal parameters and the distortion coefficients is based on Zhengyou Zhang calibration method.

9. The 3D scanning method according to claim 5, wherein stereo calibration method is used in respectively calibrating the spatial position relationship between the first and second cameras.

10. A three-dimensional (3D) scanner, comprising:

at least two laser projectors, the at least two laser projectors corresponding to at least two different wavelengths;

at least one camera for capturing a laser pattern projected by the at least two laser projectors onto a surface of a scanned object; and a processor capable of image recognition and 3D reconstruction, wherein a spatial position relationship between light planes projected by the at least two laser projectors and the at least one camera is predetermined, an output end of the at least one camera is connected to the processor, the processor comprises a two-dimensional (2D) image laser contour line extractor, a 3D constructor, and a wavelength switching determiner that selects internal parameters and distortion coefficients of the at least one camera at a selected wavelength, and the output end of the at least one camera is connected to the 2D image laser contour line extractor, the 2D image laser contour line extractor is connected to the 3D constructor, and the wavelength switching determiner is connected to the 2D image laser contour line extractor and the 3D constructor.

11. The 3D scanner according to claim 10, further comprising
a synchronous trigger unit,
wherein the synchronous trigger unit is connected to triggering ends of the at least two laser projectors and the at least one camera; and
wherein the synchronous trigger unit synchronously triggers the at least one camera and at least one laser projector, selected from the at least two laser projectors, that corresponds to the selected wavelength.

12. The 3D scanner according to claim 10, wherein
a bandpass filter is mounted on the at least one camera, and a passing band of the bandpass filter corresponds to the at least two wavelengths of the at least two laser projectors.

13. The 3D scanner according to claim 10, wherein
the at least two laser projectors comprise a laser projector of a blue band and a laser projector of a red band.

14. A three-dimensional (3D) scanning system, comprising:
a 3D scanner; and
a scanned object,
the 3D scanner comprising:
at least two laser projectors, the at least two laser projectors corresponding to at least two different wavelengths,
at least one camera for capturing a laser pattern projected by the at least two laser projectors onto a surface of the scanned object, and
a processor capable of image recognition and 3D reconstruction;
wherein
a spatial position relationship between light planes projected by the at least two laser projectors and the at least one camera is predetermined,
an output end of the at least one camera is connected to the processor,
the processor comprises a two-dimensional (2D) image laser contour line extractor, a 3D constructor, and a wavelength switching determiner that selects internal parameters and distortion coefficients of the at least one camera at a selected wavelength, and
the output end of the at least one camera is connected to the 2D image laser contour line extractor, the 2D image laser contour line extractor is connected to the 3D constructor, and the wavelength switching determiner is connected to the 2D image laser contour line extractor and the 3D constructor.

15. The 3D scanning system according to claim 14, wherein the scanned object is disposed on a pipeline with a position signal, a linear ramp with a position signal, or a rotating platform with an angle signal.

16. The 3D scanning system according to claim 14, wherein the 3D scanner further comprises:
at least a second camera for capturing the laser pattern projected by the at least two laser projectors onto the surface of the scanned object,
wherein
a spatial position relationship between light planes projected by the at least two laser projectors and the second camera is predetermined,
an output end of the second camera is connected to the processor,
the wavelength switching determiner selects internal parameters and distortion coefficients of the second camera at the selected wavelength, and
the output end of the second camera is connected to the 2D image laser contour line extractor.

17. The 3D scanning system according to claim 16, wherein the scanned object is disposed on a pipeline with a position signal, a linear ramp with a position signal, or a rotating platform with an angle signal.

* * * * *